June 21, 1938.    C. G. KRONMILLER    2,121,321
SOLENOID MECHANISM
Filed Nov. 3, 1934

Inventor
Carl G. Kronmiller
By George H. Fisher
Attorney

Patented June 21, 1938

2,121,321

UNITED STATES PATENT OFFICE 2,121,321

SOLENOID MECHANISM

Carl G. Kronmiller, Minneapolis, Minn., assignor to Minneapolis-Honeywell Regulator Company, Minneapolis, Minn., a corporation of Delaware Application November 3, 1934, Serial No. 751,430

8 Claims. (Cl. 175—340)

This invention relates to solenoid mechanisms and particularly to solenoid mechanisms that are operated by alternating current.

Solenoid mechanisms operated by alternating current are old in the art. However, due to the use of alternating current, they hum and vibrate when energized because of the irregular holding force of alternating current which force varies from a maximum to a zero value. These hums and vibrations caused by the vibration of movable parts against stationary parts cause unpleasant noises which are extremely detrimental, particularly when such mechanisms are solenoid valves which are used in domestic heating systems where quietness is essential. To remedy this, the movable elements of such mechanisms have been operated against positive stops and held thereagainst by means of shading coils. This effectively corrected the hums and vibrations and unpleasant noises but caused a new and further disadvantage, that of sticking of the movable element against the positive stops.

It is therefore the prime object of this invention to provide a quiet solenoid mechanism operated by alternating current which will not hum or vibrate and which will not become stuck in its shifted positions.

More specifically, it is an object of this invention to provide a solenoid mechanism, having a stationary core and a movable coil cooperating therewith to operate a movable element, said movable coil moving in a fixed path and out of contact with stationary stops.

A further object is to provide a novel pivot means for a movable coil for operating an element to insure quietness of operation.

A still further object is to provide an actuated element and switching mechanism that are both operated by a movable coil upon energization thereof.

Other objects and advantages will become apparent to those skilled in the art by reference to the accompanying description and drawing in which.

While my invention resides in a solenoid mechanism of general application, the mechanism is particularly applicable to the solenoid valve art. The device is accordingly shown and described in connection with this application.

Figure 1:
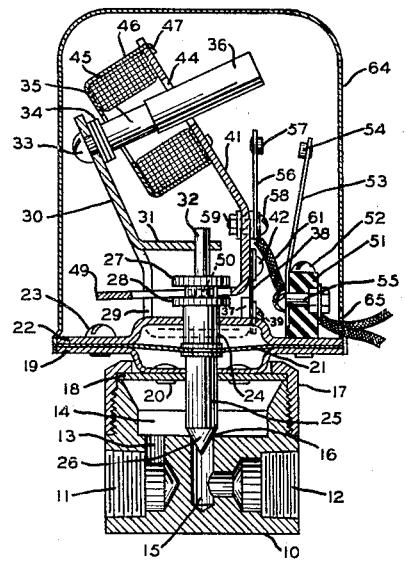
Fig. 1 is a vertical sectional view through the preferred form of my invention.

Referring to Fig. 1, a valve body is shown at 10, having inlet and outlet openings 11 and 12. The inlet opening 11 is connected by means of a vertical passage 13 to a valve chamber 14 and the valve chamber 14 is connected to the outlet passage 12 by means of another vertically extending passage 15. The upper end of passage 15, where it extends into the chamber 14, forms a valve seat indicated at 16. 18 designates an annular plate which is clamped to the valve body 10 by means of a cap 17 being screwed on valve body 10. 19 designates a supporting member which is riveted to the annular plate 18 by means of rivets 20. A diaphragm 21 is clamped between the supporting member 19 and a base member 22 by means of screws 23.

25 designates a valve stem extending through the plate 18 and the supporting member 19 which is tapered at the lower portion thereof to form a valve 26 to cooperate with the valve seat 16 and which has an annular flange adjacent the upper portion thereof and an extension 32 extending upwardly therefrom. The extension 32 is screw-threaded into a sleeve 24 extending through the base 22 which has a flange at the lower portion thereof. The diaphragm 21 is clamped between this flange of sleeve 24 and the flange of the valve stem 25 to form a seal for the valve chamber. The valve is guided at its lower end by means of the annular plate 18. Sleeve 24 is provided at its upper end with spaced upper and lower flanges 27 and 28 by means of which the valve is opened and closed.

29 designates a supporting member, preferably made of brass or other non-magnetic material, having an upwardly extending flange 30 and an inwardly extending flange 31 which receives the extension 32 of the valve stem 25 to provide an upper guiding means for the valve. Secured to the upper end of the upwardly extending flange 30 by means of a brass screw 33 and spaced by means of brass washers 34 and a brass spacer member 35 is an iron core 36.

The supporting member 29 is also provided with upwardly extending flanges 37 to which are secured metallic strips or reeds 38 by means of screws 39 and plates 40. 41 designates a lever which is secured to the reeds or strips 38 by means of screws 42 and plates 43. This reed or strip construction forms a quietly acting pivot for the lever 41 since the looseness offered by the conventional pivot constructions is hereby avoided.

The upper end of the lever 41 is provided with a hole 44 adapted to encircle the iron core 36. Mounted adjacent to this hole 44 on the upper end of the lever 41 is an electric coil 45 which is held in place by a casing 46 which is secured to the lever 41 by means of bent over fingers 47 cooperating with notches 48 in the lever 41.

The lever 41 has a laterally extending arm 49 which is notched out to receive the sleeve 24 and provided with inwardly extending abutments 50 that engage between the upper and lower flanges 27 and 28 of the sleeve 24.

From this construction, when the coil 45 is energized, the lever 41 is oscillated about its pivot 38 in a clockwise direction and the abutments 50 engage the flange 27 of the sleeve 24 to raise the valve 26 from its seat 16. Upon counter-clockwise movement of the lever 41 about its pivot 38 caused by gravity upon deenergization of the coil 45, the abutment 50 engages the lower flange 28 of the sleeve 24 to move the valve 26 to its seat 16. Energization of coil 45 creates a magnetic flux which cooperates with the stationary iron core 36 to attract the coil to the right from the position shown in Fig. 1. When the coil 45 is deenergized, the weight of the coil causes counter-clockwise movement of the lever 41 because the coil is located to the left of pivot 38 of the lever 41.

Secured to the base 22 by means of screws 52 is a terminal block 51. Secured to the terminal block 51 by means of a binding post 55 is a resilient contact arm 53 having a contact 54 at its outer end. Secured to the lever 41 by means of screws 58 and nuts 59 is a contact arm 56, having a contact 57 at its outer end. Upon energization of coil 45 to move the lever 41 in a clockwise direction, the contacts 57 and 54 engage to complete a holding circuit which will be pointed out more clearly hereafter.

The coil 45 is connected by means of lead wires 60 and 60' to binding posts 62 and 63 respectively located in the terminal block 51 and the contact arm 56 is electrically connected to the binding post 63 by means of a lead wire 61 connected between the screw 58 and the binding post 63.

The moving parts above described are all enclosed by means of a cover 64 which is suitably secured to the base 22. The cover 64 has an opening 65 in its side adjacent the terminal block 51 to accommodate lead wires leading from exterior points to the terminal block 51.

Figure 2:
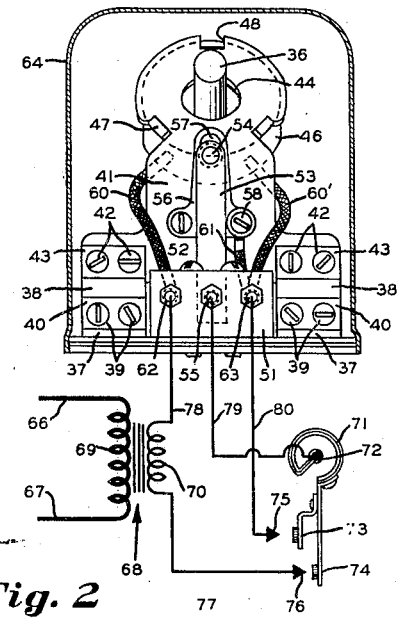
Fig. 2 is an elevational view looking from the right in Fig. 1 with the cover shown in section and the electrical control means diagrammatically shown.

Fig. 2 shows diagrammatically a suitable electrical means for energizing the coil 45 in response to changes in a condition such as temperature. However, the invention is not to be limited to the particular means shown for energizing the coil 45. Any suitable circuit may be employed.

Line wires are designated at 66 and 67 and are connected to the primary 69 of a step down transformer 68 which has a secondary 70.

A thermostat is designated at 71 and it is held in place by means of a binding post 72. The thermostat has contacts 73 and 74 adjacent the lower end thereof which cooperate respectively with stationary contacts 75 and 76. The distance between the contacts 74 and 76 is less than the distance between the contacts 73 and 75.

One end of the secondary 70 of the transformer 68 is connected by means of a wire 77 to the lower stationary contact 76 and the other end of the secondary 70 of the transformer 68 is connected by means of a wire 78 to the binding post 62. The binding post 55 is connected by means of a wire 79 to the binding post 72 of the thermostat 71. The binding post 63 is connected by means of a wire 80 to the upper stationary contact 75.

With the parts in the position shown in Fig. 2, the operation of the device is as follows: upon a rise in temperature, the contacts 73 and 74 are moved to the left but since the distance between the contacts 74 and 76 is less than the distance between the contacts 73 and 75, contact 74 will engage contact 76 first. Upon such an engagement a circuit is not completed because the contacts 54 and 57 are opened by reason of the fact that the lever 41 is maintained in a counter-clockwise position by gravity. Upon a further slight rise in temperature, contact 73 engages contact 75 thereby completing a circuit from the secondary 70 of transformer 68 through wire 77, contacts 76 and 74, contacts 73 and 75, wire 80, binding post 63, coil lead wire 60', coil 45, coil lead wire 60, binding post 62 and wire 78 back to the secondary 70. Upon completion of such circuit, coil 45 is energized to create a magnetic flux which cooperates with the iron core 36 to move the lever 41 in a clockwise direction. When the lever 41 is so moved, contact 57 engages contact 54 thereby closing a second and holding circuit from secondary 70 of transformer 68 through wire 77, contacts 76 and 74, thermostat 71, binding post 72, wire 79, binding post 55, contact arm 53, contact 54, contact 57, contact arm 56, wire 61, binding post 63, coil lead wire 60', coil 45, coil lead wire 60, binding post 62 and wire 78 to the secondary 70 of the step down transformer 68. As long as the thermostat maintains contact 74 in engagement with contact 76, the coil 45 will remain energized to maintain the valve in the open position. When the temperature falls sufficiently, contact between the contacts 74 and 76 is broken thereby deenergizing the coil 45 whereupon the lever 41 is moved in a counter-clockwise direction by force of gravity moving the valve 26 to its valve seat 16.

Figures 3, 4:
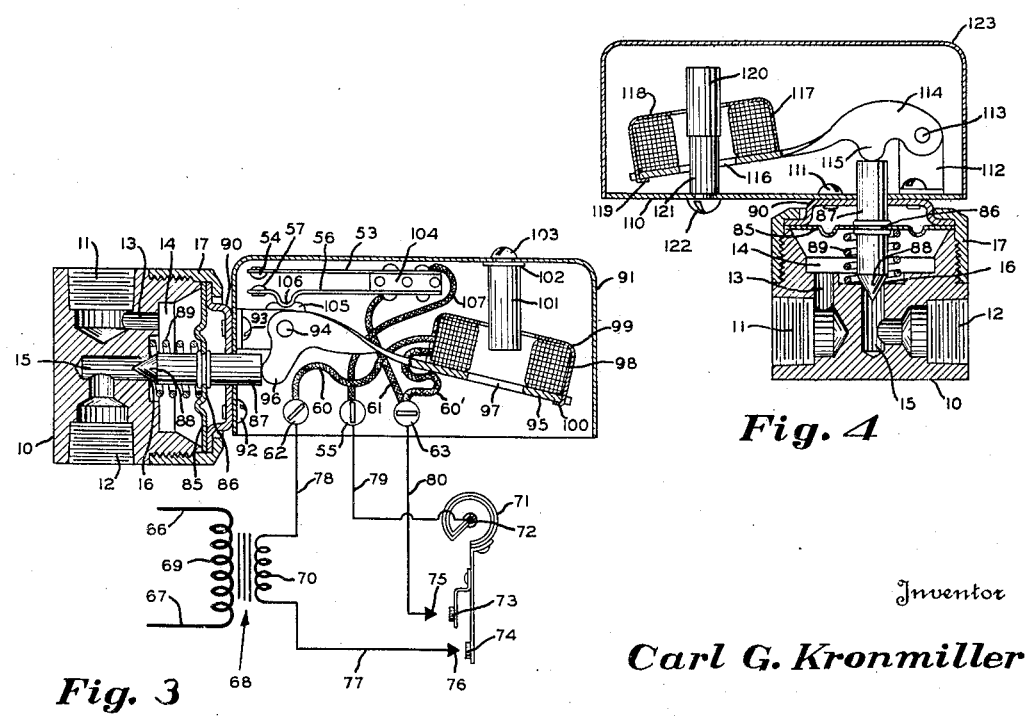
Fig. 3 is a vertical sectional view through a modification of my invention also showing the electrical means for controlling the solenoid in diagrammatical form.
Fig. 4 is a vertical sectional view of another form of my invention.

Referring now to Fig. 3, the valve casing 10 is the same as the valve casing of Fig. 1, having inlet and outlet openings 11 and 12 which communicate with a valve chamber 14 by means of passages 13 and 15 having a valve seat 16 located in the inner end of the passage 15. Clamped between the valve casing 10 and the cap 17 is a diaphragm 85 and a support 90. The diaphragm is suitably secured to the valve stem 87 as at 86 to effectively seal the valve chamber 14. The valve stem is provided with a tapered portion to provide a valve 88 which coacts with the valve seat 16. Surrounding the valve stem 87 is a compression spring 89, one end of which abuts against the valve casing 10 and the other end of which abuts against the diaphragm 85 to urge the valve 88 away from its seat 16. Secured to the support 90 by means of screws 92 is a casing 91.

One of the screws 92 also supports a bracket 93 which pivotally supports, by means of a pivot pin 94, an arm 95 which has a downwardly extending projection 96 that cooperates with the valve stem 87. The outer end of the lever 95 is provided with an opening 97 and it supports a coil 98 adjacent said opening 97. The coil 98 is held in place by means of a casing 99 which is secured to the lever 95 by means of fingers 100.

Secured to the casing 91 by means of a brass screw 103 and spaced therefrom by means of a brass washer 102 is an iron core 101 adapted to protrude into the coil 98 and the opening 97 in the lever 95.

Upon energization of the coil 98, the lever 95 is moved in a counter-clockwise direction about its pivot 94 to move the projection 96 away from the valve stem 87 to permit spring 89 to move the valve 88 away from its seat 16. Upon deenergization of coil 98, the lever 95 is moved in a clockwise direction by gravity to force the downwardly extending projection 96 into engagement with the valve stem 87 to move the valve 88 against its seat 16.

Secured to a side wall of casing 91 is an insulating block 104 which carries contact arms 53 and 56, having contacts 54 and 57. Mounted on the pivot pin 94 is a cam 105 which cooperates with a follower 106 of the contact arm 56, said cam 105 being rotated in synchronism with the lever 95. Contact arm 53 is connected to the binding post 55 by means of a wire 107 and the contact arm 56 is connected to the binding post 63 by means of a wire 61 and the coil 98 is connected to the binding posts 62 and 63 by lead wires 60 and 60' respectively.

The electrical means for energizing the coil 98 is identical to the means illustrated in Fig. 2 and therefore a complete description of the operation of this modification is not deemed necessary, it being sufficient to say that upon energization of the coil 98 by engagement of contacts 74 and 76 and 73 and 75, the lever 95 is rotated in a counter-clockwise direction to open the valve and to rotate the cam 105 to cause engagement between contacts 54 and 57 which completes a second and holding circuit identical to that pointed out above.

Fig. 4 illustrates a modified form of my invention and comprises exactly the same valve mechanism as disclosed in Fig. 3 and like reference characters have been used. However, in this modification, the valve is adapted for horizontal connection, while in Fig. 3, the valve is adapted for vertical connection. A base 110 is secured to the annular plate 90 by means of screws 111 and one of these screws 111 supports a vertical extending bracket 112 to which is pivoted by means of a pivot pin 113 a lever 114. Lever 114 is provided with a downwardly extending abutment 115 which is in engagement with the valve stem 87. The outer end of the lever 114 is provided with an opening 116 and supports a coil 117 adjacent this opening. The coil 117 is secured to the lever 114 by means of a casing 118 clamped to the lever 114 by means of inturned fingers 119.

Secured to the base 110 by means of a brass screw 122 and spaced therefrom by means of a brass spacer 121 is an iron core 120 protruding through the coil 117 and the opening 116 in the lever 114. The moving parts above described are enclosed in a cover 123 which is suitably secured to the base 110.

Upon energization of coil 117 in any suitable manner, lever 114 is moved in a clockwise direction about its pivot 113 to raise the projection 115 to permit the spring 89 to move the valve 88 away from its seat 16. Upon deenergization of coil 117, the lever 114 is moved in a counter-clockwise direction by gravity to move the projection 115 into engagement with the valve stem 87 to force the valve 88 against its seat 16 against the action of spring 89.

In the modification shown in Figs. 3 and 4, the coil is energized by alternating current to raise the same against gravity. Since the holding force of alternating current varies from a maximum to a zero value, and since there is a steady gravitational pull on the coils, the coils will vibrate a very slight amount. If the pivots 94 and 113 of the levers 95 and 114 were loose, a vibrating and chattering noise would occur at these points by reason of the vibration of coils 98 and 117. However, springs 89 act in opposition to the gravitational force and maintain the levers 95 and 114, the pivots 94 and 113 and the brackets 93 and 112 in close fitting and snug relation, thereby preventing any clattering noise or vibration at these points. Since the coil is not operated against any positive stop and since vibration is prevented in the pivots, the operation of the solenoid mechanism is extremely quiet and there is no danger of its sticking in either of its shifted positions.

In the preferred form of the invention illustrated in Figs. 1 and 2, it is noted that there is no spring acting against the action of gravity, therefore, in order to prevent noises at the pivot of the lever 41, a novel pivot for the lever 41 is provided as described above which comprises metal strips or reeds 38 which are rigidly secured to the base 29 and the lever 41. By reason of this novel pivot construction, vibration and detrimental noises will not occur at this pivot as would occur in the conventional pivot constructions.

Also, in this construction, provision is made whereby the amount of vibration of coil 45, consequently of the lever 41, is materially decreased giving further improved performance. When the coil is in the position shown in Fig. 1, there is a gravitational force acting thereon through an effective moment arm which is the horizontal distance between the center of gravity of coil 45 and the pivot 38. This moment is relatively large when the coil is in the position shown in Fig. 1. However, upon energization of the coil 45, the coil is moved to the right whereupon the effective moment arm is decreased to a very small value since the center of gravity of coil 45 is only slightly out of alignment with the pivot 38. In this way, the gravitational effort acting on the coil 45 to move the valve 26 to its closed position is extremely small when the coil 45 is energized. Therefore, when the alternating current which provides the magnetic holding force for maintaining the coil 45 in this upper position falls to zero, there will not be as much force tending to move the valve to its closed position. Since this gravitational effort which counteracts the varying magnetic holding effort of the coil 45 is substantially decreased when the coil 45 is energized, the vibrations of the coil 45 must also be substantially decreased. Therefore, it is seen that in this modification provision is not only made for providing a quiet solenoid mechanism by the use of a novel pivot means, but the amount of vibration which is inherent in alternating solenoid mechanisms is substantially reduced by the relative location of the moving parts.

From the above, it is seen that I have invented a quiet solenoid mechanism operated by alternating current which will not hum or cause detrimental noise and which will not become stuck in its shifted position.

It is to be understood that while the invention is shown as applied to a solenoid valve, the invention is not to be so limited. It is believed to be obvious that the actuating mechanism is suitable for operating not only a valve but any element movable between first and second positions.

While several embodiments of this invention have been shown and described, it is obvious that many modifications may be apparent to those skilled in the art and consequently, this invention is to be limited only by the scope of the appended claims.

I claim:

1. In a device of the character described, an element, spring means urging said element toward one position, a lever operatively connected to said element, a pivot for said lever, a coil carried by said lever and adapted by reason of its weight to normally hold said element in a second position, a stationary core associated with said coil and adapted to cause movement of said coil to permit said spring to move said element into said first position upon energization of said coil.

2. In a device of the character described, an element, spring means urging said element toward one position, a lever operatively connected to said element, a pivot for said lever, a coil carried by said lever and adapted by reason of its weight to normally hold said element in a second position, a stationary core associated with said coil and adapted to cause movement of said coil to permit said spring to move said element into said first position upon energization of said coil, said spring also serving to maintain said pivot tight.

3. In combination, an element to be actuated, and an electromagnetic actuator therefor comprising a pivoted lever associated with said element, an inclined stationary core, a coil mounted on said lever surrounding said core, said lever extending substantially perpendicularly to said inclined core and connected to said element to be actuated in a manner such that the weight of the coil constantly exerts a moment on said lever tending to move said element in one direction, and means for directly energizing said coil so as to move said coil and said lever in a direction to move said element in the opposite direction and to decrease said moment.

4. In combination, an element movable between first and second positions, a stationary core, a coil loosely surrounding said core and a pivoted lever carrying said coil and operatively connected to said element to urge said element to said first position by gravitational action throughout the range of movement of said element and adapted upon energization of said coil to move said element to said second position in opposition to and with a decrease in said gravitational action.

5. In a device of the character described, an element movable between first and second positions, a stationary core, a coil loosely surrounding said core, a pivoted lever carrying said coil and operatively connected to said element to move the same between said first and second positions, said element being constantly urged in the direction of said first position by a moment acting on said lever throughout the range of movement of said element, said moment being less when said element is in its second position than when it is in its first position, and means to energize said coil to move said element to said second position in opposition to said moment.

6. In a device of the character described, an element movable between first and second positions, a stationary core, a coil loosely surrounding said core, a pivoted lever carrying said coil and operatively connected to said element to move the same between said first and second positions, the weight of said coil acting through a moment arm to constantly urge said element towards said first position throughout the range of movement of said element, said moment being less when said element is in its second position than when it is in its first position, and means to energize said coil to move said element to said second position in opposition to said moment.

7. In combination, an element to be actuated and an electromagnetic actuator therefor comprising a pivoted lever associated with said element, an inclined stationary core, a coil mounted on said lever surrounding said core, said lever extending substantially perpendicularly to said inclined core and connected to said element to be actuated in a manner such that the weight of the coil constantly exerts a moment on said lever tending to move said element in one direction, said lever being so positioned with respect to said core that when said coil is deenergized the electromagnetic center thereof is below the electromagnetic center of said core, and means for directly energizing said coil to move said coil upwardly along said core and to rotate said lever in the direction of a vertical position whereby said element is moved in the opposite direction and said moment is decreased.

8. In combination, an element movable between first and second extreme positions, a stationary core, a coil having a cylindrical passage therethrough and directly electrically connected with means to energize the same, a pivotally mounted lever having a relatively flat apertured face remote from its point of pivotal movement and disposed perpendicularly to the plane of movement of the lever, a cup-shaped apertured member enclosing said coil and clamping the same against the flat face of the lever with the apertures of said cup-shaped member and said lever aligned with the passage of said coil and with said core extending through said passage, an operative connection between said lever and said element effective to cause said element normally to be held in said first position by the weight of the coil and to be moved from said first to said second position upon energization of said coil, the weight of said coil being operative to move said element back to said first position upon deenergization of said coil.

CARL G. KRONMILLER.